A. ROSENBERG.
SUSPENSION DEVICE.
APPLICATION FILED SEPT. 6, 1913.
1,137,906.
Patented May 4, 1915.
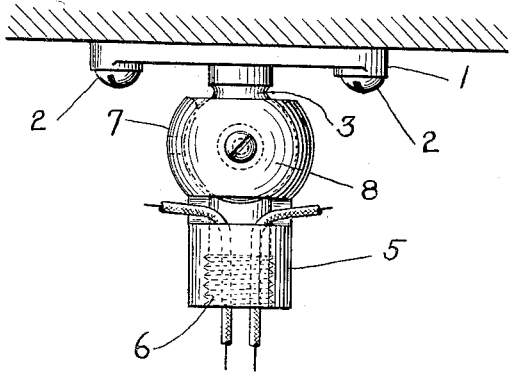
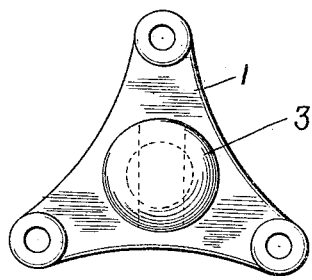
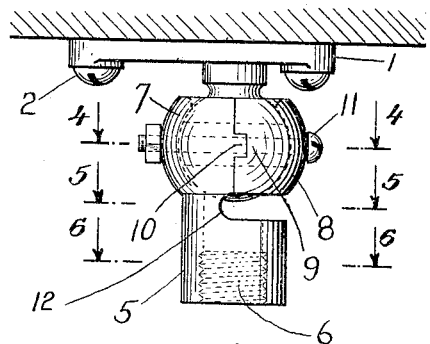
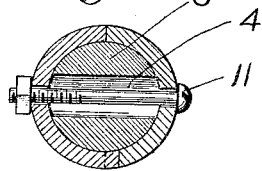
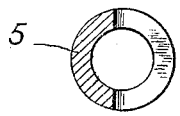
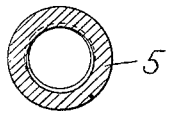
WITNESSES
INVENTOR
Arthur Rosenberg
BY Chas. J. Earll.
ATTORNEYS

UNITED STATES PATENT OFFICE.

ARTHUR ROSENBERG, OF NEW YORK, N. Y.

SUSPENSION DEVICE.

1,137,906.  Specification of Letters Patent. Patented May 4, 1915.

Application filed September 6, 1913. Serial No. 788,403.

*To all whom it may concern:*

Be it known that I, ARTHUR ROSENBERG, a citizen of the United States of America, and resident of Jamaica, borough of Queens, city and State of New York, have invented certain new and useful Improvements in Suspension Devices, of which the following is a specification.

My invention relates to a suspension device for electroliers.

The object of my invention is to provide a suspension device for electroliers and similar purposes which shall be simple and effective, and one which is especially convenient for installing.

My invention consists in providing an inverted base adapted to be secured to the ceiling by means of screws or in any other suitable manner, in providing a socket which is adapted to be secured to the electrolier, and a universal joint connection between said socket and said inverted base of novel construction, which shall permit a limited movement of the socket with reference to the base, so that, the electrolier when attached thereto will hang plumb, and in providing means for preventing the socket from turning more than a limited amount upon the base, so as to prevent injury to the electrical connections, which would otherwise result from unlimited turning of the socket on the base.

In the drawings accompanying and forming part of this specification Figure 1 is a side view of the preferred form of my invention, Fig. 2 is a bottom view of the inverted base, Fig. 3 is a side view taken at right angles to Fig. 1, Figs. 4, 5 and 6 are sections taken on line 4—4, 5—5 and 6—6 respectively of Fig. 3.

Numeral 1 represents the inverted base which is secured to the ceiling by means of the screws 2; this base has depending from it and secured to it a ball or spherical lug 3 having a transversed hole 4 through its center. The socket 5 provided with a threaded lower end adapted to receive the upper end of an electrolier has formed integrally with it at its upper end a spherical recessed extension 7 adapted to receive the ball 3 of the inverted base. A cap 8 which is also spherically recessed to fit the ball 3 is provided with a groove 9 adapted to receive the tongue 10. The cap 8 is securely held in position upon the extension 7 of the socket by a screw or bolt 11 which passes through the cap and extension and through the hole 4 in the ball 3, the bolt being of smaller diameter than the hole 3 to permit a limited turning or movement of the socket in any direction. An opening 12, between the cap 8 and the socket 5, is formed to permit the passage of conducting wires therethrough.

The suspension devices heretofore used have been provided with a socket rigidly attached to the base, and as the base is relatively small compared with the length of the electrolier very careful shimming is required to make the electrolier hang plumb, involving considerable time and expense. As will be readily understood, by means of my improved construction, the electrolier will automatically hang plumb without the necessity for any care in the adjustment of the base to the ceiling, and at the same time the swinging or turning of the socket on the base is so limited as to prevent injury to the insulation of the wires.

Having thus described my invention what I claim is:

1. In a suspension device the combination of two members, one constituting a base and the other an internally threaded socket having a lateral opening through the side wall of said socket, and one of said members having a ball secured thereto provided with a transverse hole through said ball, and the other member provided with a spherical recess adapted to receive said ball and provided with a transverse hole in alinement with and of smaller diameter than the hole in said ball, and a pin or bolt through said holes.

2. A suspension device comprising a base having a spherical lug provided with a transverse hole there-through secured thereto, a threaded socket provided with a hemispherical recess adapted to receive said spherical lug, a hemi-spherical cap, and a bolt of smaller diameter than the hole in said lug, passing through said hole and said spherical lug and said cap.

3. A suspension device for electroliers comprising a base member adapted for securement to a ceiling or the like, and having a depending spherical projection with a horizontal perforation therethrough, a divided socket member engaging said projection and having opposite perforations in line with the perforation in said projection, means on said socket for the attachment of an electrolier, and a clamping member extending through said perforations for securing the socket member on the spherical projection of the base member, said clamping member being of less diameter than the perforation in the projection to permit limited universal movement of the electrolier.

4. A suspension member for electroliers comprising a base member adapted for securement to a ceiling or the like, a spherical projection depending from said member and having a horizontal perforation therethrough, a two-part socket member adapted to engage said spherical projection and having a perforation in each member in line with the perforations in said projection, a sleeve integral with one of said socket member parts for the attachment of an electrolier, and a clamping member extending through said perforations to hold the two parts of the socket member together upon said spherical projection, said clamping member being of less diameter than the perforation in the projection to permit limited universal movement of the electrolier.

5. A suspension device for electroliers comprising a base member adapted for securement to a ceiling or the like, a spherical projection depending from said member and having a horizontal perforation therethrough, a two-part socket member fitted to said spherical projection, each of said parts having a perforation which perforations are in line with the perforation in said projection, a sleeve integral with one socket part for the attachment of an electrolier, a clamping bolt extending through said perforations and of less diameter than the perforation in the projection to permit limited universal movement of the socket member, and a tightening nut for the bolt exterior of the suspension device.

6. A suspension device for electroliers comprising a base member adapted for securement to a ceiling or the like, a spherical projection depending from said member and having a horizontal perforation therethrough, a two-part socket member fitted to said spherical projection each of said parts having a perforation which perforations are in line with the perforation in said projection, a sleeve integral with one of said socket parts for the attachment of an electrolier, an outlet opening being formed between said sleeve and the other part of the socket member for the passage of an electric wire, a clamping bolt extending through said perforations and of less diameter than the perforation in the projection to permit limited universal movement of the socket member, and a tightening nut for the bolt exterior of the suspension device.

In testimony whereof, I have signed my name to this specification in the presence of two subscribing witnesses.

ARTHUR ROSENBERG.

Witnesses:
T. J. RIORDAN,
W. C. JORDAN.

Copies of this patent may be obtained for five cents each, by addressing the "Commissioner of Patents, Washington, D. C."